(12) United States Patent
Ren et al.

(10) Patent No.: US 7,533,360 B1
(45) Date of Patent: May 12, 2009

(54) FLOW BASED PACKAGE PIN ASSIGNMENT

(75) Inventors: Haoxing Ren, Austin, TX (US); Hua Xiang, Yorktown Heights, NY (US); Tingdong Zhou, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/177,648

(22) Filed: Jul. 22, 2008

(51) Int. Cl.
  *G06F 17/50* (2006.01)
(52) U.S. Cl. ......................................................... 716/12
(58) Field of Classification Search ................. 716/1–2, 716/8, 11–17
  See application file for complete search history.

(56) References Cited

U.S. PATENT DOCUMENTS

| | | | |
|---|---|---|---|
| 5,360,767 A * | 11/1994 | Narayanan et al. ............. | 716/12 |
| 7,117,468 B1 * | 10/2006 | Teig et al. ...................... | 716/11 |
| 7,216,308 B2 | 5/2007 | Teig et al. | |
| 7,299,444 B1 | 11/2007 | Tai et al. | |
| 2003/0188286 A1 * | 10/2003 | Teig et al. ....................... | 716/13 |
| 2008/0034342 A1 * | 2/2008 | Petunin et al. ................. | 716/15 |
| 2008/0263500 A1 * | 10/2008 | Kato et al. ....................... | 716/16 |
| 2008/0276214 A1 * | 11/2008 | Bartley et al. .................. | 716/15 |

\* cited by examiner

*Primary Examiner*—Stacy A Whitmore
(74) *Attorney, Agent, or Firm*—The Law Firm of Andrea Hence Evans, LLC

(57) ABSTRACT

The present invention provides a method of performing BSM assignments for each routing layer typically having one BSM group (e.g. memory bus) per layer. Further, the present invention provides for routable BSM assignments. Further, the present invention provides a method for handling pair constraints providing for differential pairs to be placed close to each other. Further, the method of the present invention provides for simultaneous routing and pin assignments while honoring pair constraint concerns and optimizing wire length.

1 Claim, 13 Drawing Sheets

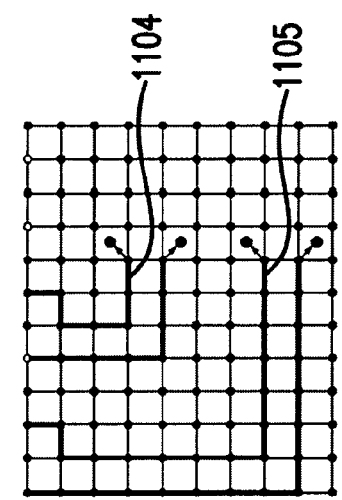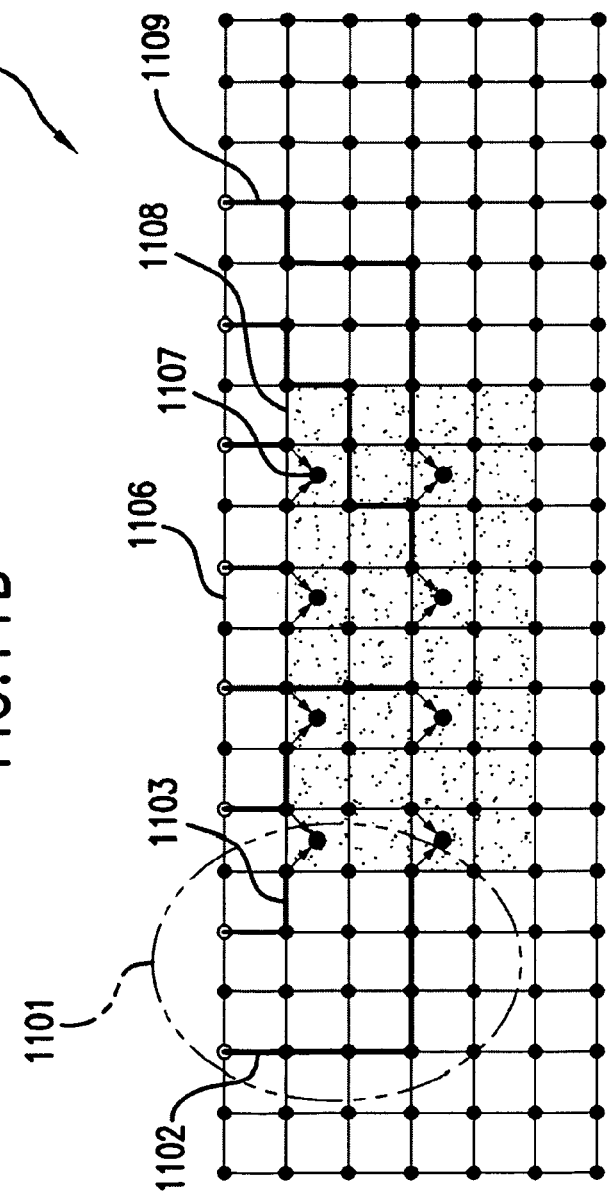

FLOW BASED PACKAGE PIN ASSIGNMENT

CROSS REFERENCE TO RELATED APPLICATIONS

There are no cross-references related to this application.

FIELD OF THE INVENTION

The present invention relates to the field of flow networks and more particularly to systems and methods for providing minimum cost/maximum flow algorithms from calculating bottom surface metal (BSM) assignments. Relevant potential applications for this invention include first level packaging design, and the interface between chip packaging and an associated card.

BACKGROUND OF THE INVENTION

High end package design comprises thousands of pins and constraints. The current design process is to finish the high level planning first, and then to define the pins in a certain area to one memory port. Traditionally, the pin assignment is done by humans manually. Designers of the physical card fan out the pins in a group and line up the traces with the traces from the dual in-line memory modules (DIMMs). The whole process needs several weeks for a processor board having eight DIMMs. After the first pass, any change to a signal pin assignment can ripple to a lot of pins in the same group since the wiring channels are fully utilized.

SUMMARY OF THE INVENTION

The present invention provides an apparatus and method of flow based package pin assignment.

A min-cost-max-flow based algorithm is proposed to address the package pin-assignment concerns. The proposed algorithm simultaneously assigns pins for multiple nets and simultaneously minimizes the total routing length. Meanwhile, the proposed algorithm is extended to handle the case that some nets are to be paired such that their routing has to be close to each other. By modifying the graph construction, the algorithm can continue to perform pin assignments and routing for multiple nets, and successfully address the pair-constraints so that the routing of the paired nets are next to each other.

Additional aspects, objectives, and features of the present invention will become apparent from the following description of the preferred embodiments with reference to the attached drawings.

BRIEF DESCRIPTION OF THE DRAWINGS

FIG. 11A illustrates edge splitting in a flow solution, in accordance with the embodiments of the present invention.

FIG. 11B illustrates edge splitting paths in a flow solution, in accordance with the embodiments of the present invention.

DETAILED DESCRIPTION OF THE INVENTION

The present invention provides an automated pin assignment solution. It assigns the pins (BSM) of packages that will be placed on PCBs (printed circuit boards). The BSMs need to be assigned such that they can be routed to outside entities through the PCB.

On a high performance processor board, we usually have memory DIMMs to CPU module interconnection. The pinout of the DIMMs are known since the DIMMs are usually designed from industrial standards. Therefore the bit ordering of this interface is well defined.

The wiring challenge characteristic to high performance processor boards manifests itself in that, due to the limited available signal layers in a PCB, assigned for signal wiring and strict wiring rules are necessary for reasons of signal integrity. It is usually impossible to interconnect large amounts of memory DIMMs to a multi-processor module if the BSM assignment of the module is not optimized for the card wiring. As an example, a typical module contains eight DIMMs and one processor module that houses four processor chips. To achieve a PCB having optimal manufacturability, we have to contain all the memory to a processor wiring in eight signal layers. The current approach to performing this optimization is a manual approach.

Figure 1:
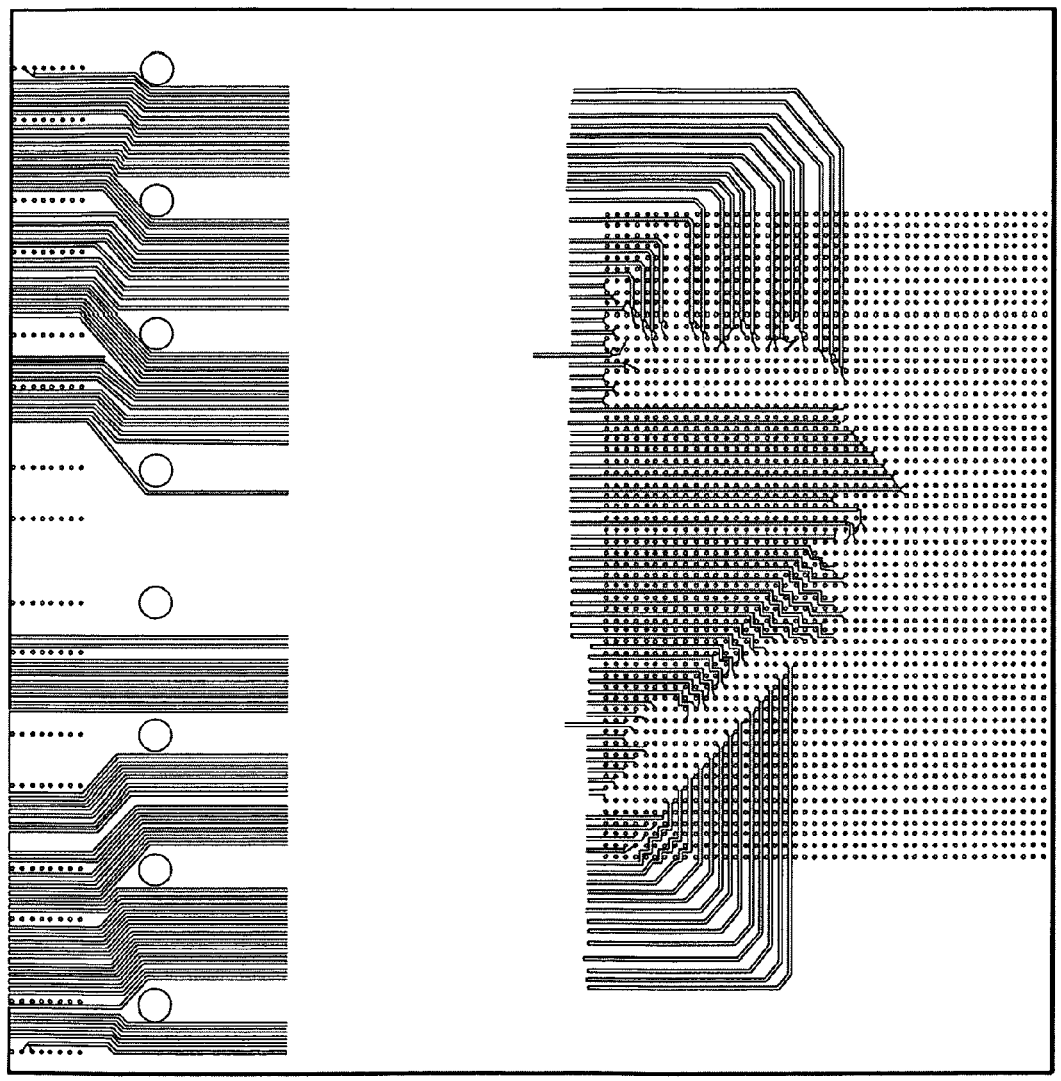
FIG. 1 illustrates an example of a typical BSM conflict, in accordance with the embodiments of the present invention.

FIG. 1 illustrates an example of a typical BSM conflict, in accordance with embodiments of the present invention. The left part is the DIMM pins and the right part is the MCM pins. The target is to assign MCM pins such that the given set of nets can be routed without crossing violations.

Figure 2:
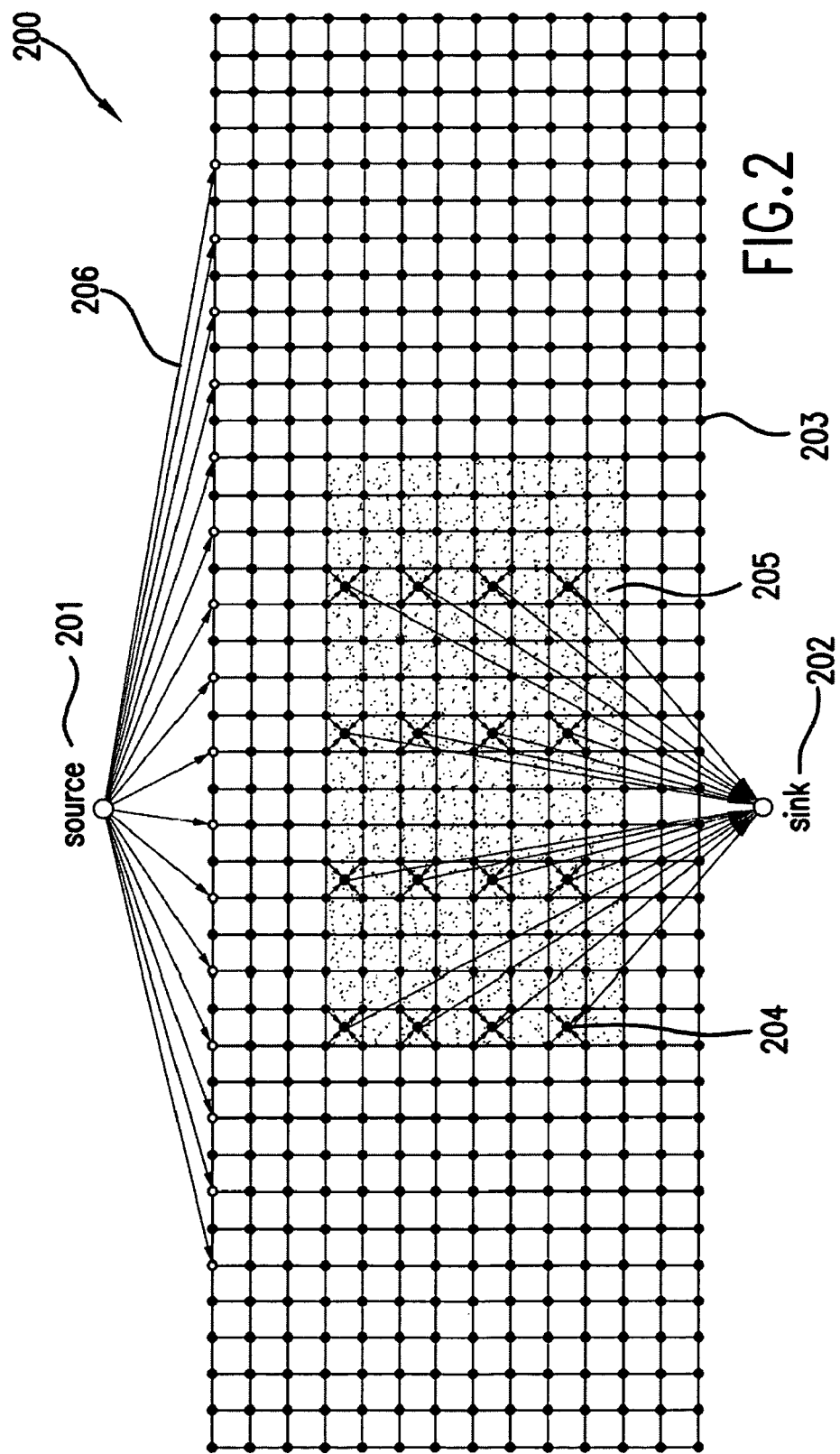
FIG. 2 illustrates a constructed flow network for a typical BSM conflict, in accordance with the embodiments of the present invention.

FIG. 2 illustrates The constructed flow network 200, having a source 201 and a sink 202, is representative of a typical BSM conflict, in accordance with embodiments of the present invention. In FIG. 2, the BSM conflict is on a 40×14 (i.e. 40 horizontal×14 vertical) routing grid. There are 16 DIMM pins 204 on the top of the routing region 203. The DIMM pin pitch is twice of the routing pitch. Also, there are 16 MCM (multichip modules) pins as shown in the gray region 205. The horizontal MCM pin pitch is 4 times of the routing pitch, and the vertical MCM pin pitch is twice of the routing pitch. A flow network is constructed based on the routing grid. One source node 201 and one sink node 202 are generated. All DIMM pins are connected from the source node, and all MCM pin nodes are connected to the sink node 202. Model routing (e.g. escape routing) uses and edge/node capacity of one. In FIG. 2, as represented by arrows 206, the source 201 connects to all the memory bus pins with edge capacity of one. The BSMs connect to the sink 202 with edge capacity of one.

Figure 3:
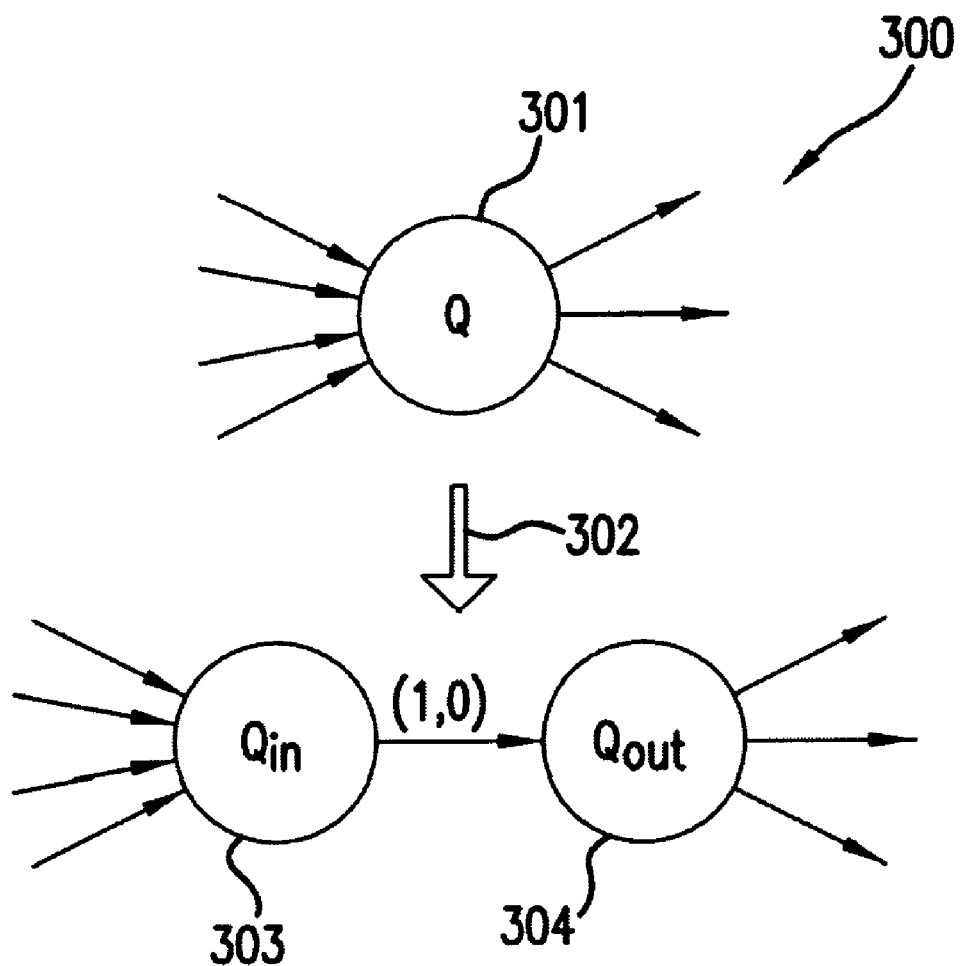
FIG. 3 illustrates a node splitting diagram, in accordance with the embodiments of the present invention.

FIG. 3 illustrates a node splitting diagram, in accordance with embodiments of the present invention. By splitting one node Q, represented by element 301, into two nodes Qin and Qout, represented by elements 303 and 304 respectively, the node capacity is converted to edge capacity (i.e., the capacity of Q is represented by the capacity of the edge (Qin, Qout)). All incoming edges of Q are connected to Qin and Qout connects to all outbound edges of Q.

Figure 4:
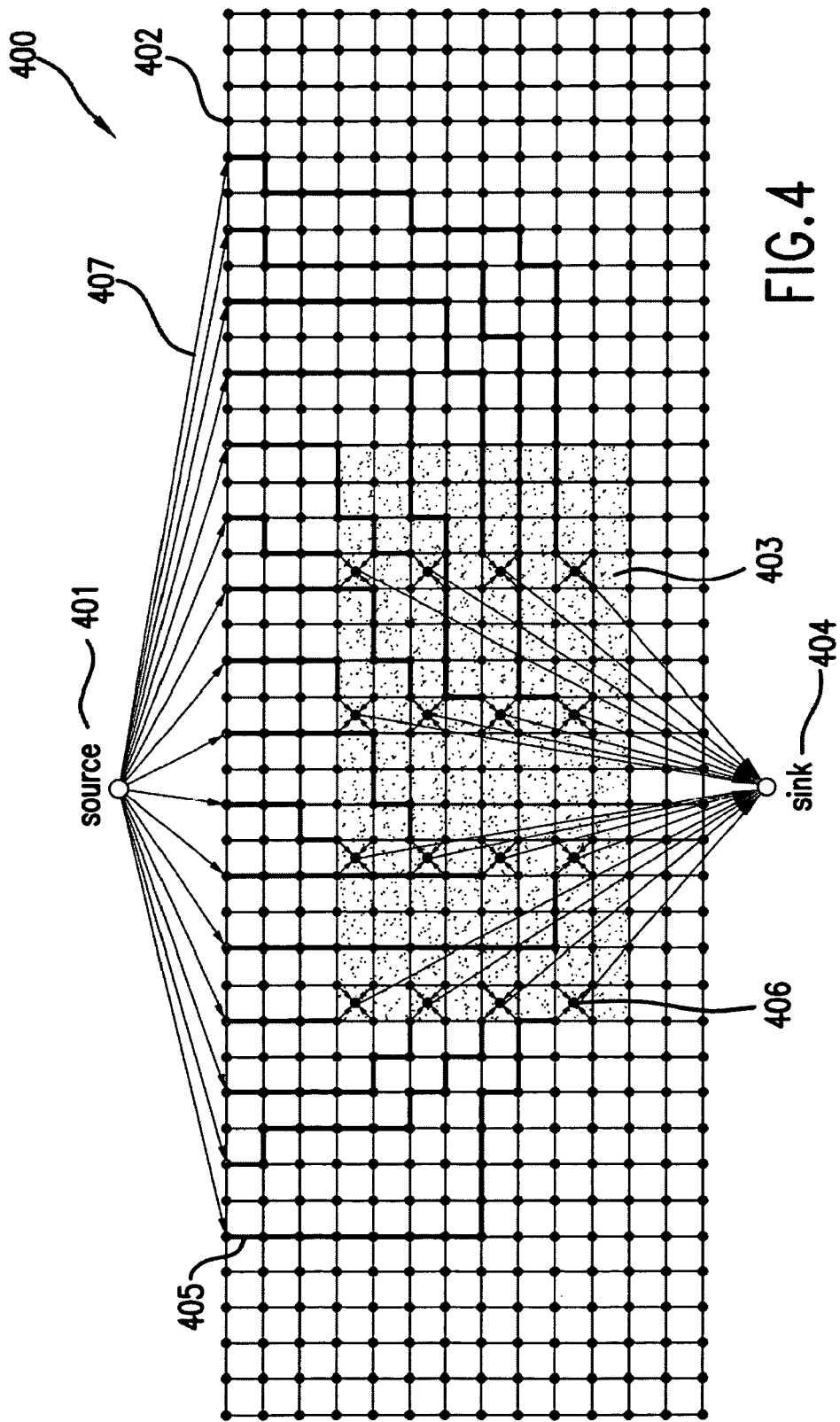
FIG. 4 illustrates the flow solution of a constructed flow network for a typical BSM conflict, in accordance with the embodiments of the present invention.

FIG. 4 illustrates a constructed flow network 400, having a source node 401 of the flow network 400 and a sink node 404, is representative of a typical BSM conflict, in accordance with embodiments of the present invention. The flow network 400 is constructed based on a routing grid. In FIG. 4, the BSM conflict is on a 40×14 routing grid composed of routing grid nodes 402. The flow obtained by the min-cost-max-flow algorithm is on the routing grid is represented by thick lines 405. One path corresponds to the pin assignment of one net. There are 16 DIMM pins 406 on the top of the multi-chip modules (MCM) routing region 403. The DIMM pin pitch is twice of the routing pitch. Also, there are 16 MCM pins, as shown in the MCM routing region 403. The horizontal MCM pin pitch is 4 times of the routing pitch, and the vertical MCM pin pitch is twice of the routing pitch. One source node 401 and one sink node 402 are generated. All DIMM pins are connected from the source node 401, and all MCM pin nodes are connected to the sink node 404. Model routing (e.g. escape routing) uses and edge/node capacity of one. In FIG. 4, as represented by arrows 407, the source 401 connects to all the memory bus pins with edge capacity of one. The BSMs connect to the sink node 404 with edge capacity of one.

Figure 5:
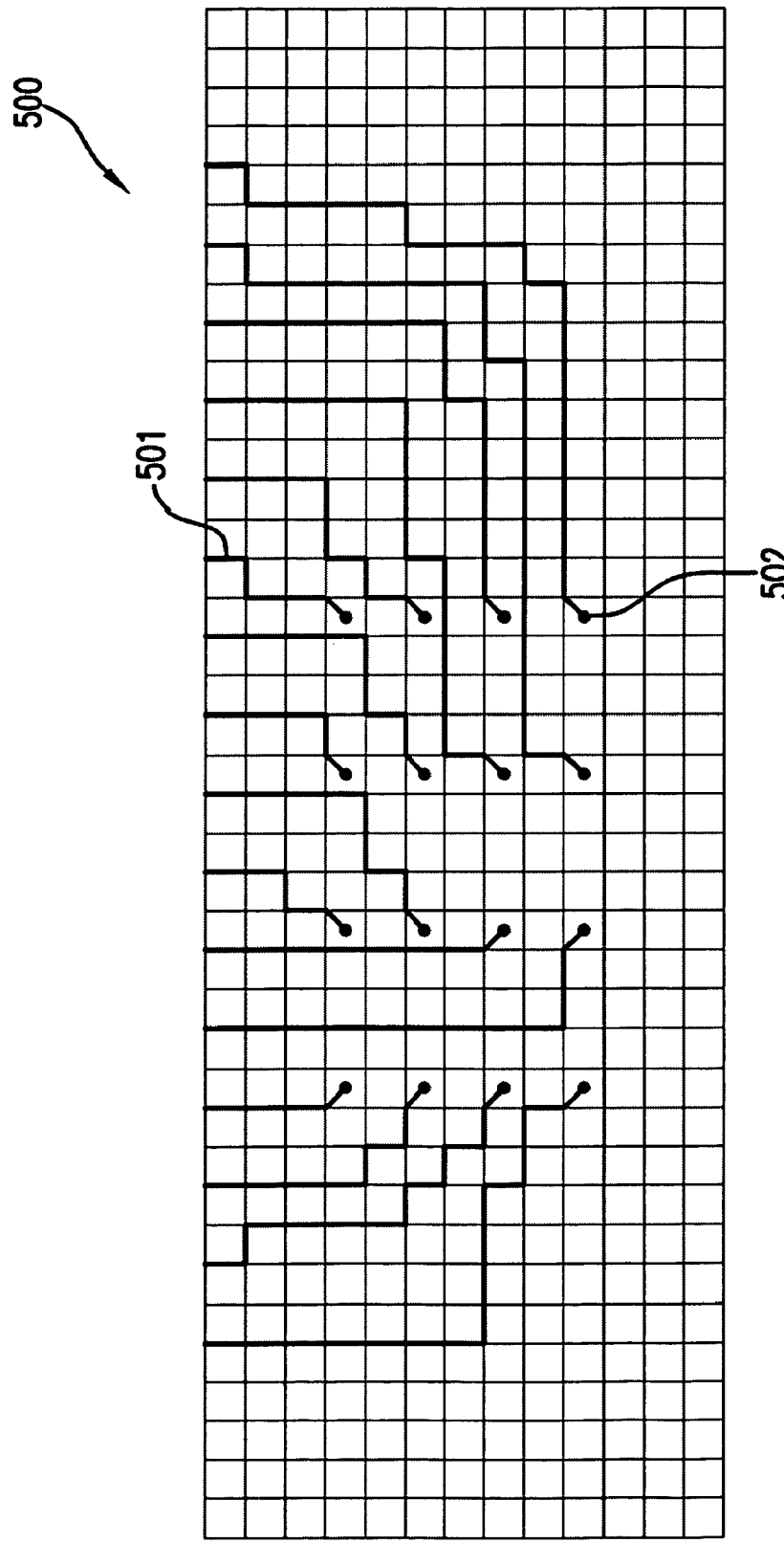
FIG. 5 illustrates a flow solution for the flow network shown in FIG. 4, in accordance with the embodiments of the present invention.

FIG. 5 illustrates A BSM solution for the typical BSM conflict shown in FIG. 2, in accordance with embodiments of the present invention. In FIG. 5, 501 represents the routing path for nets which indicate the pin assignment for each net. Further, 502 represents the MCM pins.

Figure 6:
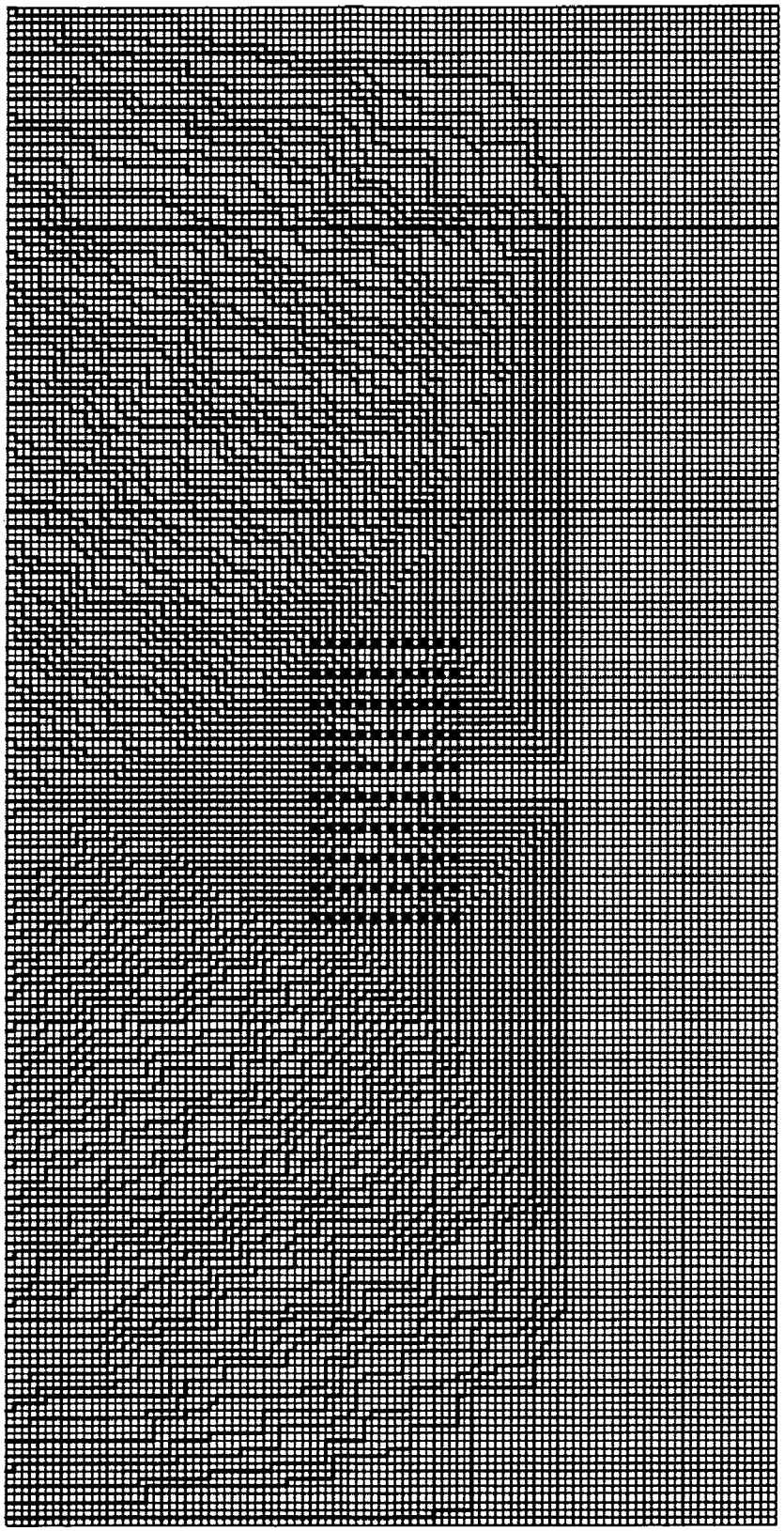
FIG. 6 illustrates a routing grid showing a flow network solution, in accordance with the embodiments of the present invention.

FIG. 6 illustrates a BSM solution for a BSM conflict with 200×100 routing grid. There are 100 DIMM pins and 10×10 MCM pins, in accordance with embodiments of the present invention.

Figure 7:
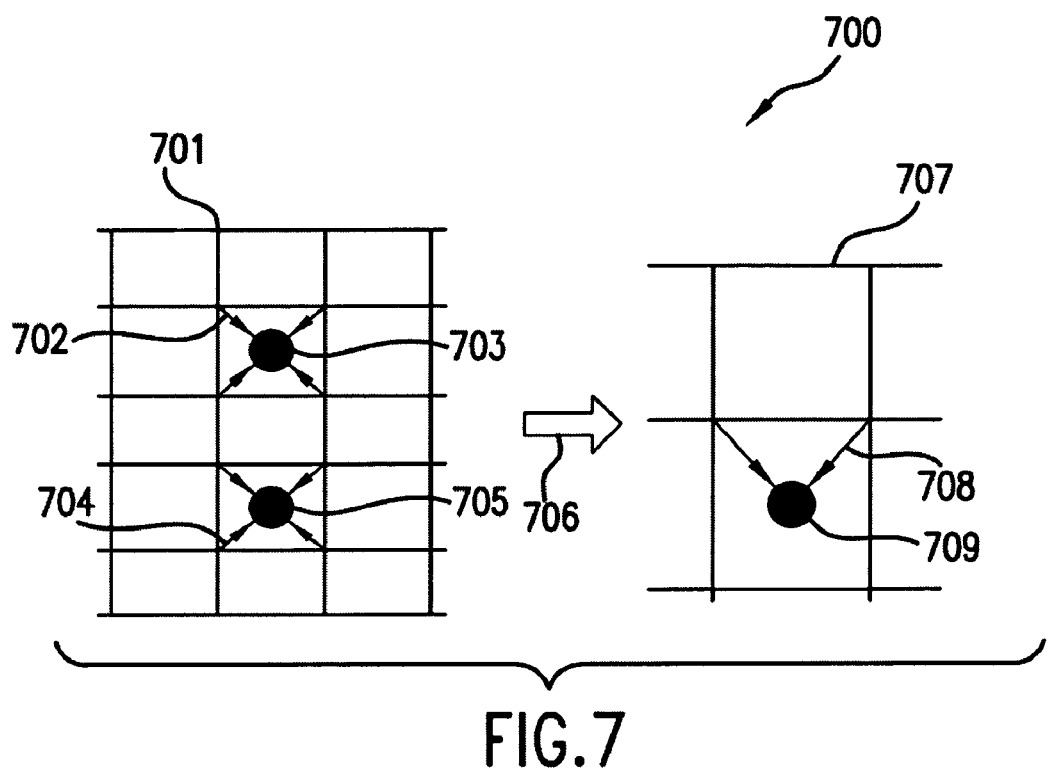
FIG. 7 illustrates pairing constraints in a routing grid, in accordance with the embodiments of the present invention.

FIG. 7 illustrates a pairing constraint solution 700 for a routing grid 701, 707, in accordance with embodiments of the present invention. To handle the pairing constraints represented in routing grid 701, the routing grid 701 is scaled by two, (i.e., every two horizontal/vertical lines are represented by one horizontal/vertical line). Also, every two vertically adjacent MCM pins shown by pins 703 and 705 are denoted by one node 708 in newly sized grid 707. Further, only two edges from upper-left and upper-right, as depicted by arrow 708 are connected to the new node. In the aspect of the embodiment of FIG. 7, the differential pairs should be routed together and the BSMs assigned for each pair should be within sqrt(2) mm.

Further, optimally, the routing resource is scaled by two and the BSM node is scaled by two. The present invention provides for solving maximum flow concerns on the scaled network before expanding the un-scaled network.

Further, pins are simultaneously assigning for multiple nets. The chosen pin assignment minimizing the total routing length. The algorithm is extended to handle pair-constraints in which some nets are to be paired such that the routing of each net must be close to each of a different net. FIG. 7 further depicts modifying a graph construction in order that the algorithm can continue to perform pin assignment and routing for multiple nets and successfully addressing the pair-constraints so that the routing of the paired nets are next to each other.

Figure 8:
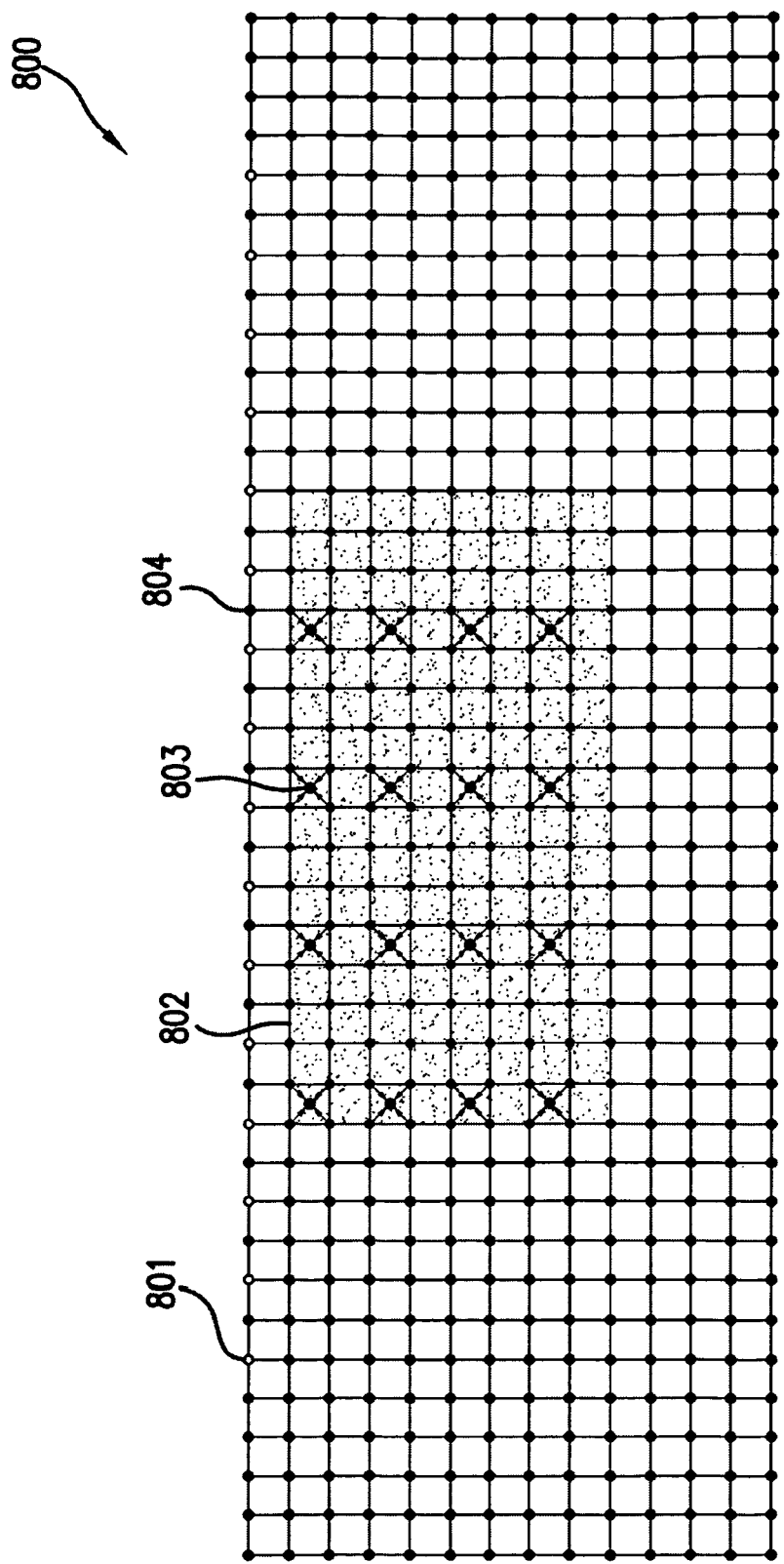
FIG. 8 illustrates a routing grid showing typical BSM conflicts and pairing constraints, in accordance with the embodiments of the present invention.

FIG. 8 illustrates a typical BSM conflict with pairing constraints, in accordance with embodiments of the present invention. The routing grid is 40×14, and there are 16 DIMM pins and 4×4 MCM pin array.

Figure 9:
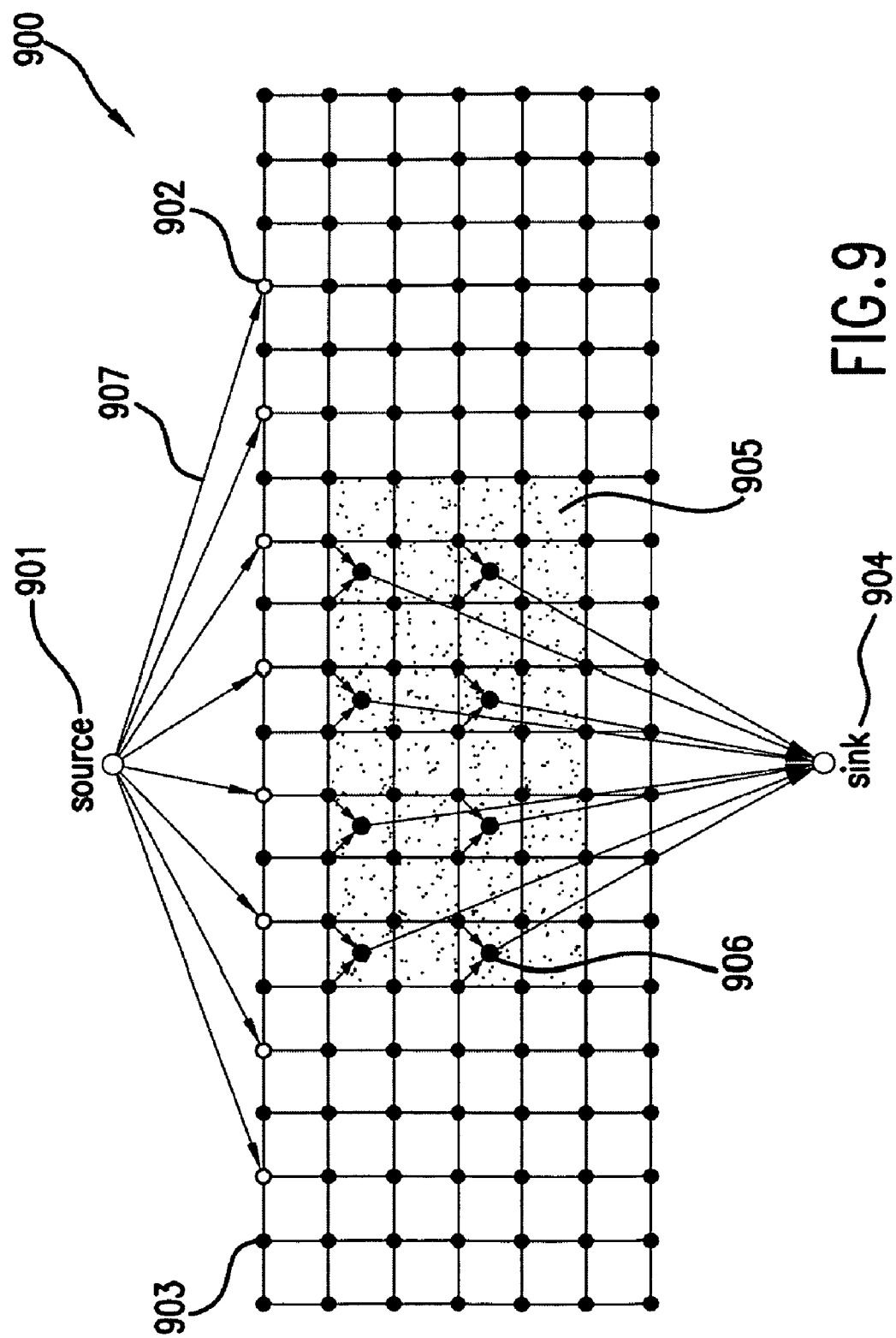
FIG. 9 illustrates a construction flow network corresponding to FIG. 10, in accordance with the embodiments of the present invention.

FIG. 9 illustrates a construction flow network solution corresponding to FIG. 8, in accordance with embodiments of the present invention. The network is based on the scaled routing grid. More specifically, FIG. 9 illustrates a constructed flow network 900, having a source node 901 of the flow network 900 and a sink node 904, is representative of a typical BSM conflict, in accordance with embodiments of the present invention. In FIG. 9, the BSM conflict is on a routing grid composed of routing grid nodes 903. Every two horizontal/vertical lines in FIG. 8 are represented by one horizontal/vertical line in FIG. 9. The detailed map is given in FIG. 7. Element 902 represents the DIMM node which corresponds to two adjacent DIMM nodes in FIG. 8. There are 8 MCM pin nodes 906 on the top of the MCM region 905. One source node 901 and one sink node 904 are generated. All DIMM pins are connected from the source node 901, and all MCM pin nodes are connected to the sink node 904. Model routing (e.g. escape routing) uses and edge/node capacity of one. In FIG. 9, as represented by arrows 907, the source 901 connects to all DIMM pin nodes with edge capacity of one. The BSMs connect to the sink node 904 with edge capacity of one.

Figure 10:
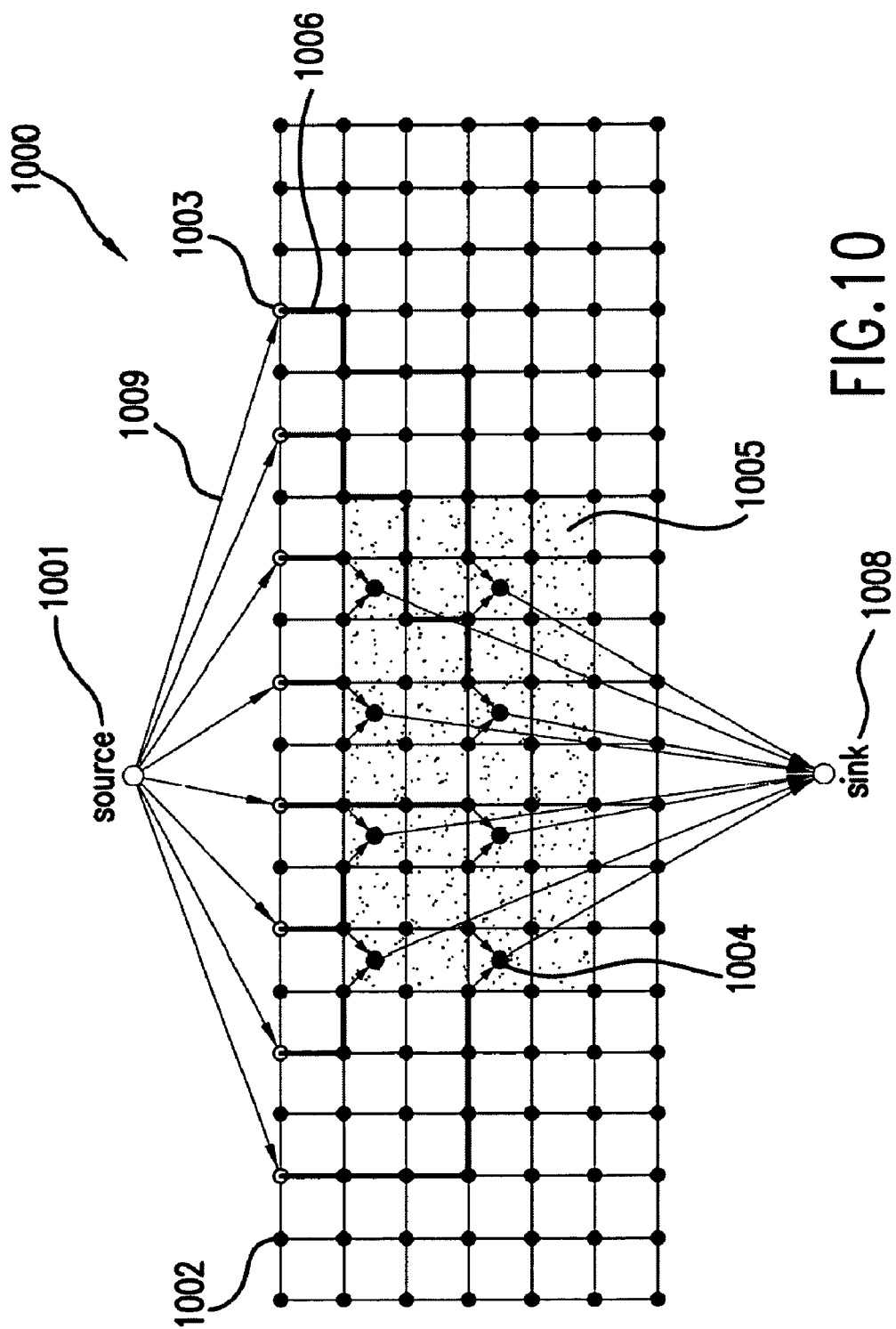
FIG. 10 illustrates a flow solution corresponding to FIG. 11, in accordance with the embodiments of the present invention.

FIG. 10 illustrates a flow solution corresponding to FIG. 9, in accordance with embodiments of the present invention. More specifically, FIG. 10 illustrates a constructed flow network 10()0, having a source node 1001 of the flow network 1000 and a sink node 1008, is representative of a typical BSM conflict, in accordance with embodiments of the present invention. The flow network 1000 is constructed based on a routing grid. In FIG. 10, the BSM conflict is on a routing grid composed of routing grid nodes 1002. Element 1003 represents the DIMM node which corresponds to two adjacent DIMM nodes in FIG. 10. The flow obtained by the min-cost-max-flow algorithm is on the routing grid is represented by thick lines 1006. One path corresponds to the pin assignment of one net. There are 8 DIMM pin nodes 1003 on the top Of the MCM routing region 1005. One source node 1001 and one sink node 1008 are generated. All DIMM pins are connected from the source node 1001, and all MCM pin nodes are connected to the sink node 1008. Model routing (e.g. escape routing) uses and edge/node capacity of one. In FIG. 4, as represented by arrows 1009, the source node 1001 connects to all the memory bus pins with edge capacity of one. The BSMs connect to the sink node 1008 with edge capacity of one.

FIG. 11A illustrates edge splitting in a flow solution 1100 for grid 1106, in accordance with embodiments of the present invention. Each edge with flow 1102 and 1103 shown in balloon 1101 is split into two edges representing paths (i.e. 1105 and 1104, respectively, as shown in FIG. 11B). And, each path formed by 1104 and 1105 in the split graph refers to one net. In this way, two paths have the similar routing pattern so that the pairing constraints are satisfied for pins 1107.

Figure 12:
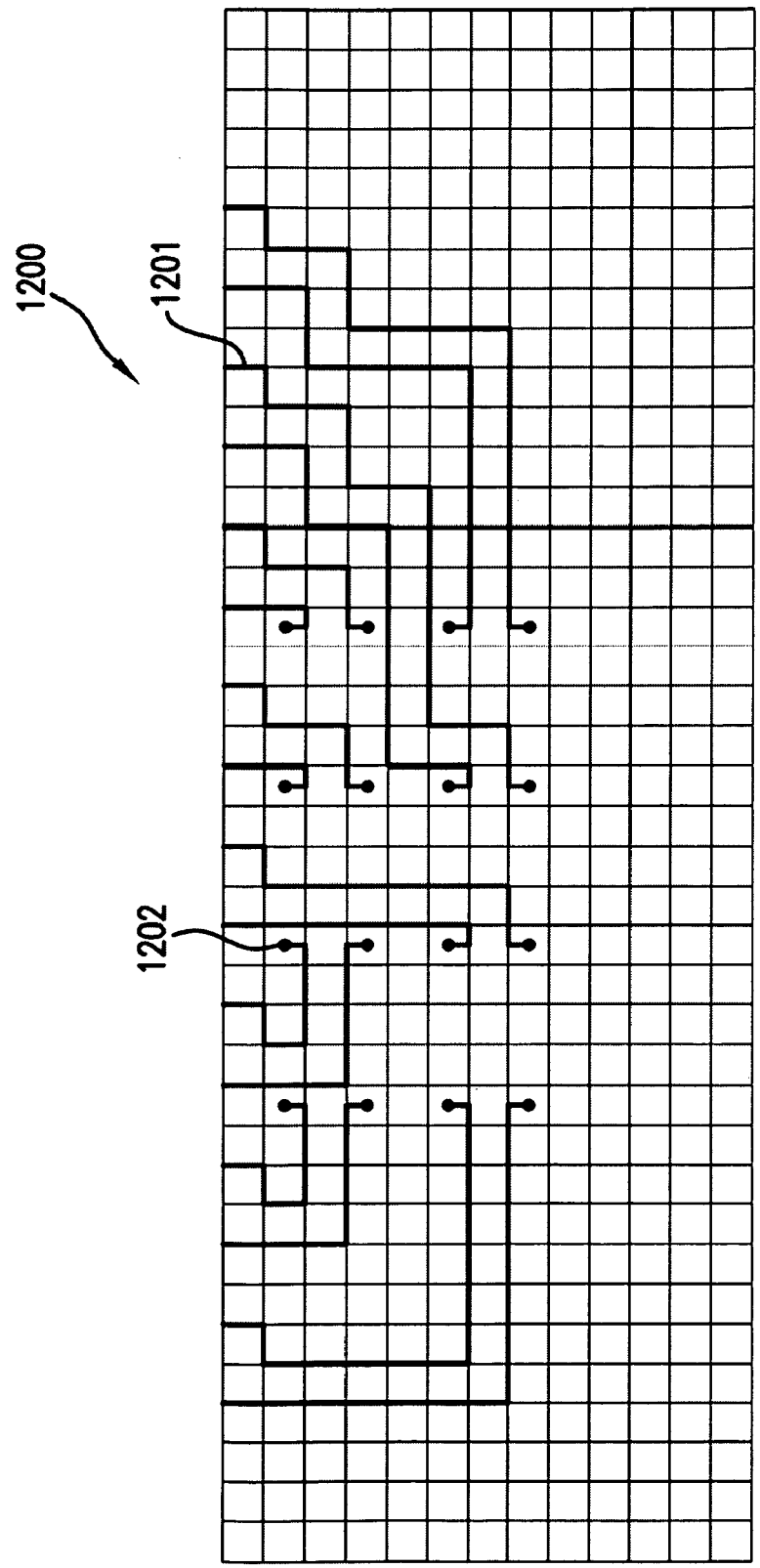
FIG. 12 illustrates a BSM solution corresponding to FIG. 10, in accordance with the embodiments of the present invention.

FIG. 12 illustrates a BSM solution 1200 corresponding to FIG. 8, in accordance with embodiments of the present invention. FIG. 4 depicts BSM solution 1200 for the BSM conflict with the pairing constraints shown. The routing grid depicted is 40×14, and there are 16 DIMM pins 1402 and 4×4 MCM pins associated with edges 1201.

Figure 13:
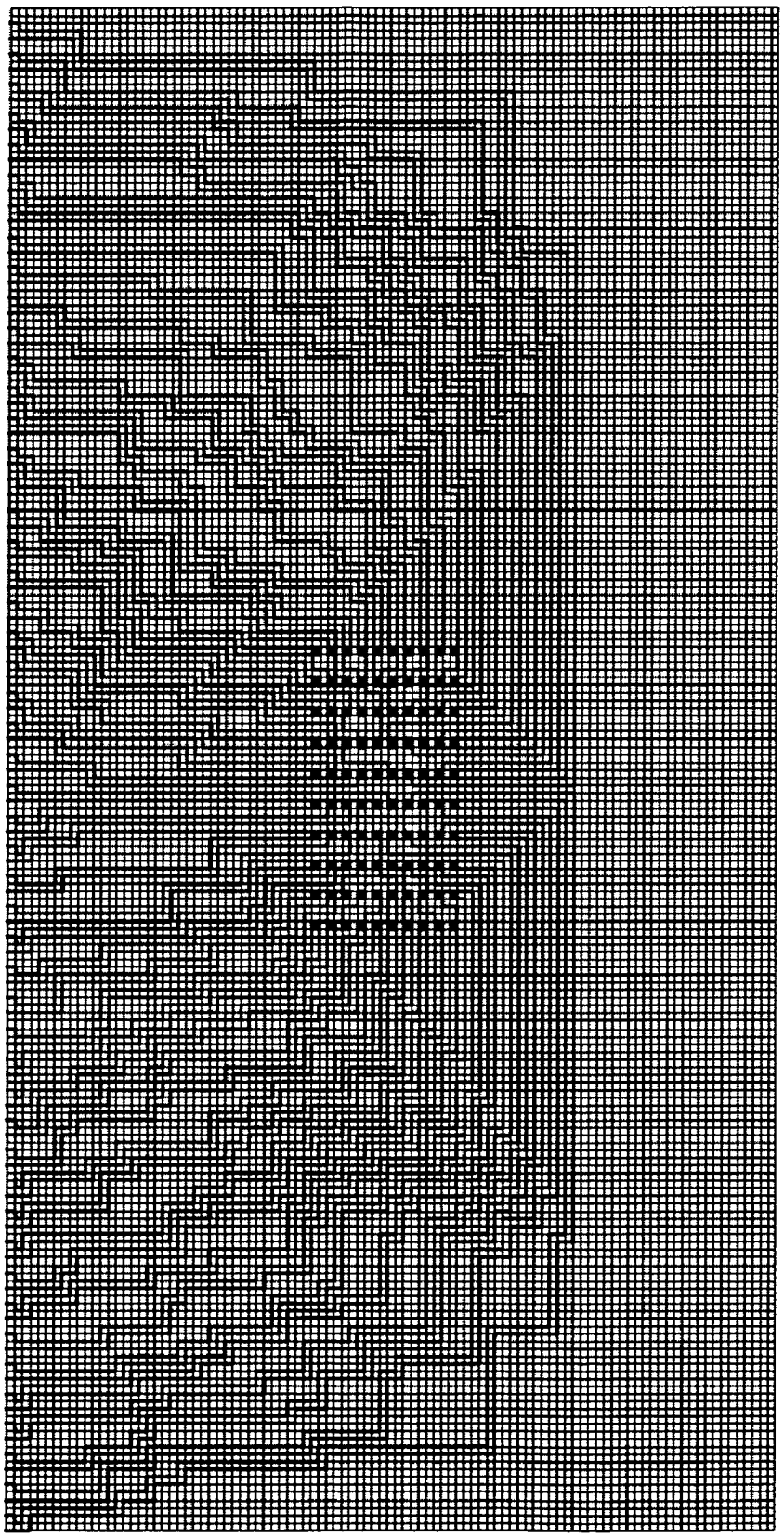
FIG. 13 illustrates a BSM solution corresponding to FIG. 10, in accordance with the embodiments of the present invention.

FIG. 13 illustrates a BSM solution corresponding to FIG. 8, in accordance with embodiments of the present invention. A BSM solution for the BSM conflict with the pairing constraints is depicted. The routing grid is 200×100 and there are 100 DIMM pins and 10×10 MCM pins.

The present invention provides solutions to the BSM conflict and is applicable to technologies using multi-BSM group assignment, C4 assignment, C4/BSM co-assignment and Multi BSM/C4 group co-assignment methods, or the like.

The apparatus and methods of this invention has been described with respect to individual PCBs. However, it is contemplated that the apparatus and methods of pin assignment may be employed with a plurality of PCBs.

The invention has been described in detail with particular reference to certain preferred embodiments thereof, but it will be understood that variations and modifications can be effected within the spirit and scope of the invention.

The invention claimed is:

1. A method of BSM pin assignment using an algorithm comprising:

simultaneously assigning pins for multiple nets;

minimizing the total routing length;

extending the algorithm to handle pair-constraints in which some nets are to be paired such that the routing of each net must be close to each of a different net;

modifying a graph construction so that the algorithm continues to perform pin assignment and routing for multiple nets;

successfully addressing the pair-constraints so that the routing of the paired nets are next to each other; and wiring the pins to at least one device.

* * * * *